United States Patent [19]
Brean et al.

[11] 3,746,430
[45] July 17, 1973

[54] IMPULSE-OPERATED, DAY-NIGHT, REAR VIEW MIRROR

[75] Inventors: John W. Brean; Yervand Mathevosian, both of Cincinnati, Ohio

[73] Assignee: D. H. Baldwin Company, Cincinnati, Ohio

[22] Filed: Sept. 15, 1971

[21] Appl. No.: 180,547

[52] U.S. Cl............................... 350/281, 318/128
[51] Int. Cl............................................. B60r 1/04
[58] Field of Search ........................... 350/279–283

[56] References Cited
UNITED STATES PATENTS
3,475,081  10/1969  Russell............................... 350/279
3,601,614  8/1971  Platzer............................... 350/279 X FOREIGN PATENTS OR APPLICATIONS
1,131,236  10/1968  Great Britain...................... 350/280

*Primary Examiner*—John K. Corbin
*Attorney*—W. H. Breunig

[57] ABSTRACT

A day-night mirror for a vehicle, photo-electrically controlled in response to light directed from rearwardly of the vehicle and to ambient light, impinging respectively on photocells which via capacitive coupling control the motion of a reversible motor, in the form of a bifilar solenoid, so that only a change in status of the photocells is communicated to the motor in the form of a pulse leaving the motor to be freely actuated manually absent such a pulse, and also reducing current drain in the system.

8 Claims, 3 Drawing Figures

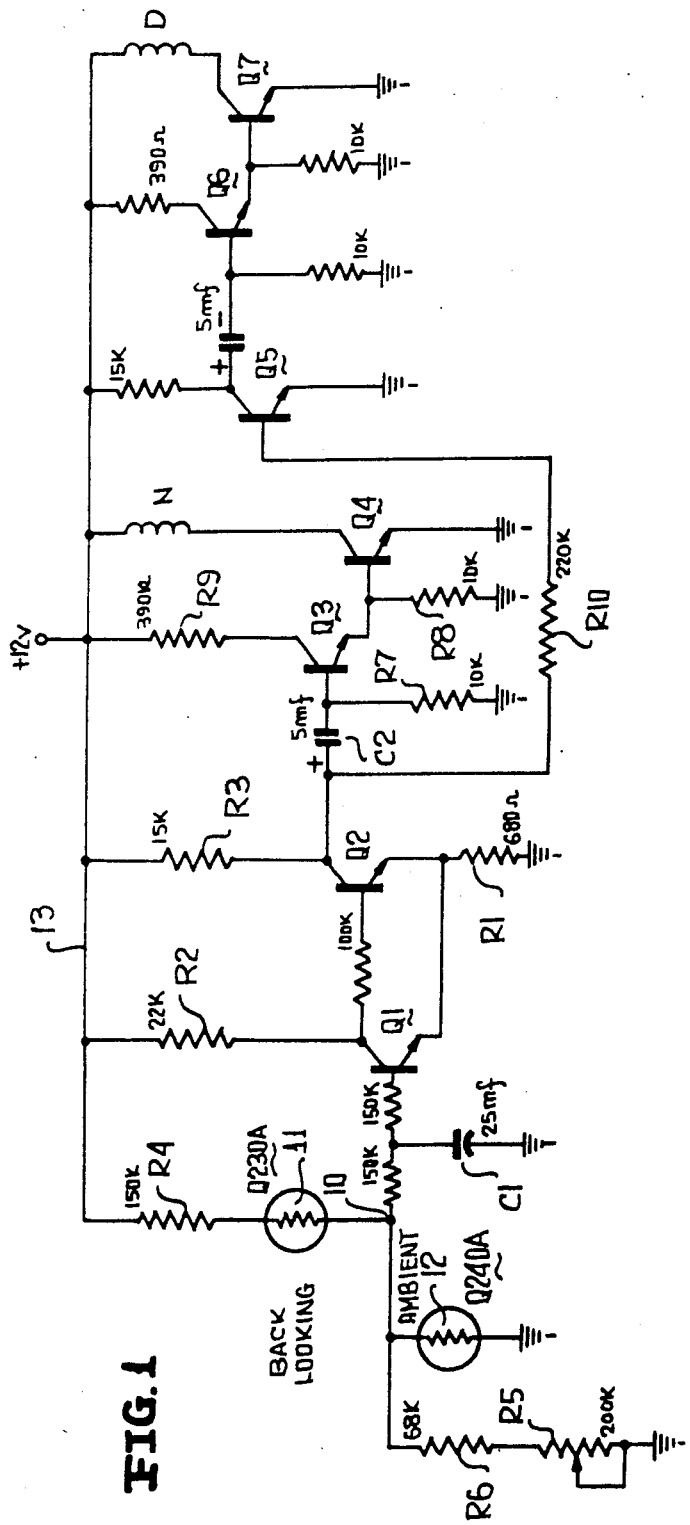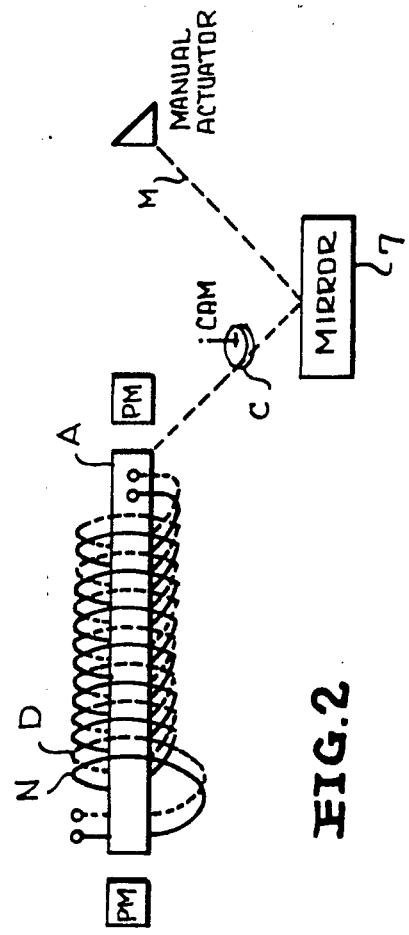

IMPULSE-OPERATED, DAY-NIGHT, REAR VIEW MIRROR

BACKGROUND

This application is related in subject matter to an application of John Brean, Ser. No. 157,941 Filed June 29, 1971, and entitled Day-Night Mirror for Vehicles, and to an application of Jordan et al, Ser. No. 24,593, filed Apr. 1, 1970, now U.S. Pat. No. 3,680,951 and entitled Photoelectrically Controlled Rear View Mirror, both applications being assigned to the assignee of this application.

In the prior Brean application a photocell which senses ambient light and another photocell which senses light arriving from rearwardly of a vehicle cooperate to control a transistor circuit, which directly, i.e., not via relays, controls a motor which modifies the attitude of a mirror with respect to a pane of glass. The latter is so oriented that it reflects light to the eyes of a driver of the vehicle at all times. A pane of glass, when uncoated, reflects only a small fraction of the light impinging thereon, so that if the mirror is so oriented that it does not reflect light toward the eyes of the driver, the driver can view rearwardly of the vehicle without glare. If the mirror is oriented in a plane parallel to the plane of the pane of glass, it becomes the primary reflecting surface viewed by the driver, the pane of glass being relatively of minor effect, and the optical system composed of the pane of glass and the mirror are then suitable for night driving.

In the Jordan et al. application, supra, ambient sensing and rearward looking photoelectric cells are dc coupled to a solenoid which drives the mirror to its alternate orientations via transistor circuitry, including power transistors, one of which is rendered conductive to drive the solenoid in one sense, and the other of which is rendered conductive to drive the solenoid in the opposite sense. One or the other power transistor is then always energized, the overall system being bistable. The mirror can then not be readily normally moved from the orientation called for by the status of the photocells, and if so moved tends to move back when released. The system involves a continuous and substantial current drain through the solenoid coil.

The system of the present invention is a variant of the system of Jordan et al., in which the photocells are only ac coupled to the solenoid via transistors, so that the latter only impulsively reverse the direction of drive of the solenoid armature, which is then releasably latched in its final position, but which can have its position modified manually, without having to overcome electrical forces due to current in the solenoid. The solenoid and its energizing transistors normally carry no current, in the present system.

SUMMARY

A day-night mirror which is photo-electrically controlled by means of an ac coupled transistor circuit, utilized to drive a solenoid motor which positions the mirror, the solenoid being supplied with current by transistors which are normally cut off, and which carry current only during transitions of mirror position.

DESCRIPTION OF THE DRAWINGS

FIG. 1 is a circuit diagram of a system according to the present invention;

FIG. 2 is a view in side elevation of a solenoid drive for a day-night mirror.

DETAILED DESCRIPTION

Figure 3:
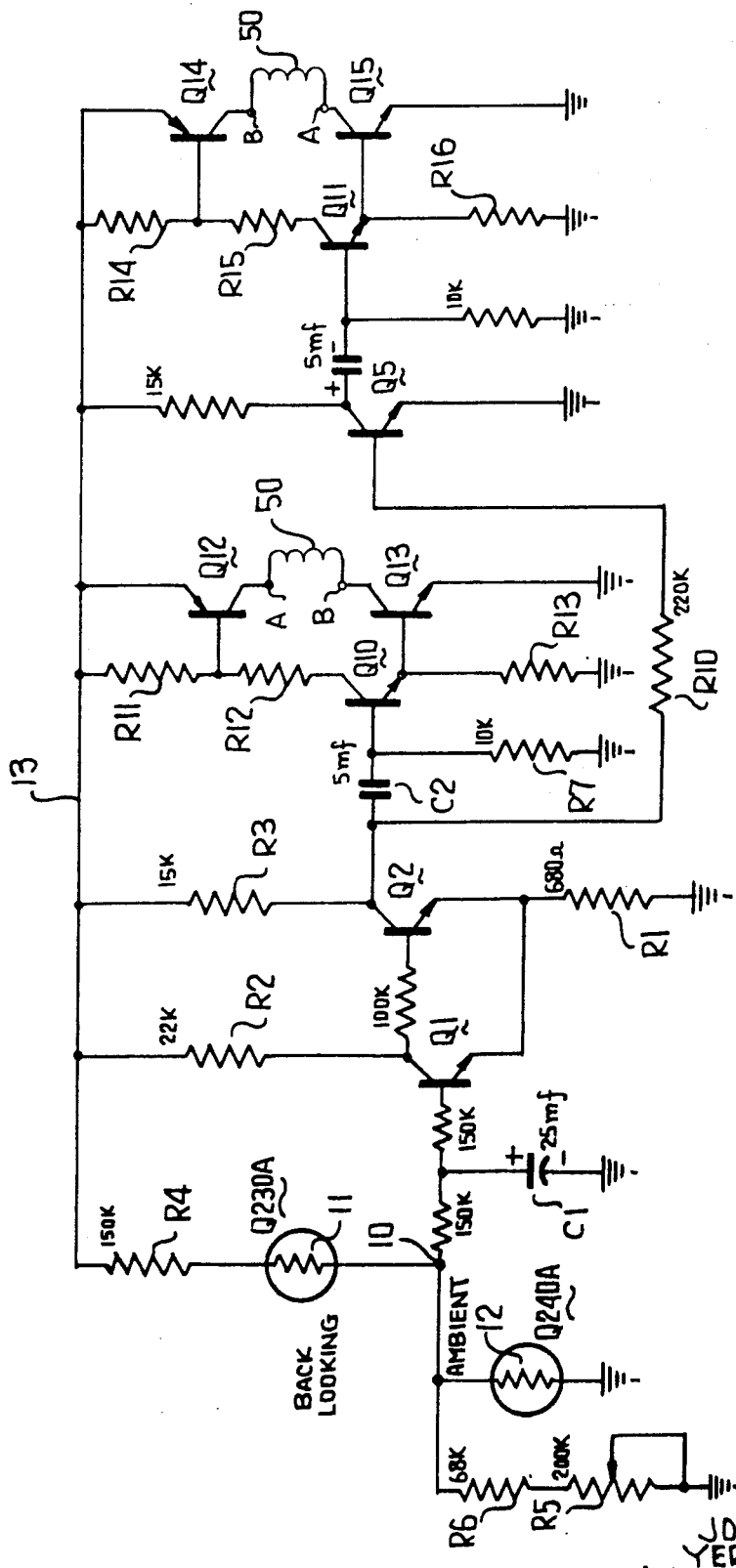
FIG. 3 is a circuit diagram of a modification of the circuit diagram of FIG. 1.

Q1 and Q2 are NPN transistors connected in a bistable configuration. The emitters of Q1 and Q2 are connected to ground through a common resistance R1, but they have separate collector loads R2 and R3, respectively. If Q1 is cut off, its collector is at supply potential, +12.V, and the base of Q2 being connected to the collector of Q1, Q2 is conductive. If Q1 is conductive, the base of Q2 is grounded, and its emitter at the voltage across R1, and it is therefore nonconductive.

The conductivity of Q1 is determined by its base voltage, which in turn is established at junction 10, between two photo-resistors 11 and 12. Photo-resistor 11 at one terminal is connected to voltage supply bus 13 via a resistance R4 of about 150.K, and at its other terminal to junction 10. Junction 10 is connected to ground via photocell 12, which is parallel by a large transient by-pass capacitor C, and 150.K resistance, and by a larger variable resistance R5 in series with a smaller fixed resistance R6.

In daylight both photo-resistors 11 and 12 are fully illuminated and of very small resistance. The base of Q1 is grounded, R4 absorbing supply voltage, Q1 is cutoff and Q2 is conductive. Q3 and Q4 are unaffected by the state of Q2, because capacitor C2 isolates the base of Q3 from the collector of Q2. Q3 has its base connected to ground through resistance R7 and is therefore cut off. The base of Q4 is connected to ground through resistance R8 and is also cut off, R8 acting both to ground the base of Q4 and as an emitter load for Q3. The collector of Q3 is connected to supply bus 13 via a very small resistance R9, but Q4 is available to supply current to one winding N of a bifilar solenoid coil. That winding is normally de-energized. Q6 and Q7 operate precisely as do Q3 and Q4, but Q7 is available to supply current to a second bifilar winding D of the solenoid coil, and accordingly winding D is normally de-energized.

Photo-resistor 11 looks rearwardly of the vehicle on which is is mounted, and photo-resistor 12 looks sideways, particularly to the left, so that 11 is responsive to a light approaching from the rear of the vehicle as well as to ambient light, but 12 only to ambient light.

Q5 conducts when Q2 is non-conductive, and vice versa, since the base of Q5 is connected via a small resistance R10 to the collector of Q2. It therefore follows that if Q2 is rendered conductive, Q5 will be rendered non-conductive, and that during the transition of Q3, Q4 will be driven by a negative pulse and Q6, Q7 by a positive pulse. If Q2 is rendered non-conductive, Q5 will be rendered conductive, and Q3 and Q4 will be driven by a positive pulse but Q6, Q7 by a negative pulse. Negative pulses have no effect on transistors which are cut off, but positive pulses cause current flow, and accordingly one of the windings N and D will be energized. These drive armature A of the solenoid in opposite directions, and tilt mirror 7 respectively into night and day positions.

So long as daylight persists the mirror is in its day position. We may assume that it was so positioned manually, via manual lever.

At night, both photo-resistors 11 and 12 are dark, assuming no following headlamps, but photo-resistor 12 is by-passed by resistances R5, R6, of much smaller resistance than inheres in the photo-resistors. Point 10 is then essentially at ground voltage, Q1 is cut off, and Q2 is conductive.

If a following vehicle illuminates photo-resistor 11, photo-resistor 12 remaining dark at night, the voltage of point 10 rises, Q1 becomes conductive, Q2 non-conductive, the voltage at the collector of Q2 rises, a pulse is transferred via C2 to the base of Q3, which becomes conductive, driving Q4 into conductivity and energizing coil N to place the mirror in night orientation or condition. As soon as the rearward vehicle passes, the voltage of point 10 decreased toward ground. Q2 becomes conductive, which has no effect on N. The drop in voltage at the collector of Q2 is communicated to Q5, which cuts off, passing an energizing pulse to Q6, Q7, and transiently energized D.

The mirror 7 is accordingly normally in fully reflecting orientation, day or night, until and unless a rearward vehicle approaches and its headlights illuminate photo-resistor 11. At that time the mirror 7 is moved by coil N via cam C so that it no longer reflects light to the eyes of the driver and this condition obtains until photo-cell 11 is no longer illuminated by the following headlamp, when a transient positive pulse occurs to coil D, pulling the mirror back to its normal condition.

Photoresistors 11, 12 are not on-off devices, but vary their resistivities according to the intensities of impinging light. The value of resistance R5 can be set such that Q1 will not change state until the light impinging on 11 attains a predetermined value under predetermined ambient conditions. For fully dark ambient conditions photo-resistor 12 represents megohms, so that the division of voltage between photo-resistors 11 and R6, R5 is not determined by the value of R5. But if a rearward headlight is far off, but provides some light, the resistance of 11 is of the order of the resistance of R5, and the potential of junction 10 therefore rises from zero in total darkness, to a positive value, as rearward illumination increases, until for some value of illumination pre-established by the setting of R5, Q1 changes state, and with it Q2.

It follows that the coils of the solenoid are energized only transiently, and are not normally energized at all. This leaves the mirror free to be positioned manually, and the manual actuator need only overcome magnetic detent force at permanent magnets PM, but not current flow to the solenoid coils D and N. No current normally flows to these coils, and impulsive current is caused to flow to the proper one of coils D and N as external conditions of ambient and rearward illumination change, while driving. An important advantage is that the present system may be dry battery driven, if desired, without undue battery drain, and does not present a continuous drain on the power source employed, whether a small dry or a large wet battery constitutes that source. The actual physical construction of the mirror and mirror motor and latch is that of Jordan et al., supra, and details are not repeated here.

The capacitor C1 is in a sufficiently long time constant circuit that changes in voltage thereacross require substantial time, so that short transient illuminations of either photo-resistor 11 or photo-resistor 12 or both cannot affect the bias on Q1.

In FIG. 3, the photo-cell circuit, involving photo-resistors 11, 12 and the associated resistances R4, R5, R6, and capacitor C1, together with bistable network involving Q1, Q2 and Q5, are identical with the corresponding elements of FIG. 1, and serve the same purposes, and thereafter the description of the circuitry and of its operation is not repeated.

Q10, Q12 and Q13 are unaffected by the state of Q2, because capacitor C2 isolates the base of Q10 from collector of Q2. Q10 has its base connected to ground through resistance R7 and is therefore cut off. Q10 being non-conductive, the base and emitter of transistor Q12 are then at the same potential, as are the base and emitter of Q13. These transistors are therefore non-conductive and winding 50 is not energized.

Q11, Q14 and Q15 are unaffected by the state of Q5 as are Q10, Q12 and Q13 by the state of Q2. Q5 conducts when Q2 is non-conductive and vice versa, since the base of Q5 is connected via resistance R10 to the collector of Q2. It therefore follows that if Q2 is rendered conductive, Q5 will be rendered non-conductive, and that during the transition Q10 will be driven by a negative pulse and Q11 by a positive pulse. If Q2 is rendered non-conductive, Q5 will be rendered conductive, and Q10 will be driven by a positive pulse, but Q11 by a negative pulse. Negative pulses have no effect on transistors which are cut off, but positive pulses cause current flow. When a positive pulse is applied to Q10, it turns on. The voltage drop across R11 then renders Q12 conductive, the drop across R13 renders Q13 conductive, and winding 50 is pulsed in the direction from A to B.

Winding 50 schematically represents a d.c. motor and is illustrated twice in FIG. 3 solely to indicate its alternative directions of energization according as to whether Q12, Q13 or Q14, Q15 are conductive.

If a positive pulse is applied to Q11, it is turned on. The voltage drop across R14 then renders Q14 conductive, the drop across R16 renders Q15 conductive, and winding 50 is pulsed in the direction of B to A.

If for coils 50 were substituted coils N and D, the circuit of FIG. 3 could be used to drive the bifilar windings N and D of the solenoid.

What is claimed is:

1. A mirror having a reflective panel which is movable between two stable positions for providing a relatively bright reflected image at a viewing position when in one of said positions and a relatively weak reflected image at said viewing position when in the other of said positions, electric motor means for moving said panel to said positions, a first photo-resistor means including normally non-conductive solid state bistable switch circuit means responsive only to decreases of light intensity to values below a predetermined level, said bistable switch circuit including solely capacitive coupling circuits connected between said bistable switch circuit means and said motor means, for only impulsively energizing said motor means in response to change of state of said bistable switch circuit to drive said reflective panel to said one position and responsive to increases of light intensity above said predetermined level for only impulsively energizing said motor means for moving said panel to said other position, and a second photo-resistor means responsive to steady state ambient light intensity above a predetermined intensity for inhibiting said first photo-resistor means and thereby maintaining said reflective panel in said one position.

2. The combination according to claim 1, further comprising adjustable means for selectively varying said predetermined intensity.

3. The combination according to claim 1, further comprising means for mounting said mirror on a motor vehicle to provide rear view vision for an operator of said motor vehicle, and wherein said second photoresistor means comprises a photosensitive element mounted to sense ambient light intensity only generally to the adjacent curb side of the motor vehicle operator.

4. In combination, a mirror, a camming device having a translatable cam and a cam follower, a pivot secured to said mirror about which said mirror oscillates angularly between two limiting positions, means linking said cam follower to said mirror so that said mirror oscillates angularly between said two limiting positions as said cam translates between two limiting positions and said cam follower correspondingly moves between two limiting positions, a reversible motor connected to drive said translatable cam between its two limiting positions, a photoelectric bistable circuit control system, including an ambient light sensing photo-resistor and a directionally sensitive light sensing photo-resistor, and means including an only ac coupled circuit responsive to said control system for only impulsively energizing said motor in response only to change of state of said bistable circuit control system to actuate said cam to move between its two limiting positions in response to an increase of intensity of high intensity light impacting on said last mentioned photo-resistor while low intensities of ambient light are sensed by both said photoresistors.

5. The combination according to claim 4, wherein said camming device includes permanent magnet latching means for magnetically latching said follower in its limiting positions.

6. A photocell motor control circuit for a day-night mirror comprising, motor means, a first circuit including a first photoelectric cell exposed to ambient light but not to light directed in a predetermined direction, a second circuit including a second photoelectric cell exposed to said ambient light and also to said light directed only in said predetermined direction, a source of voltage providing electric current, means connecting said circuits in series across said source of voltage and providing a junction between said circuits, a bistable transistor circuit having a transistor base connected to said junction, means driving said bistable circuit into one or another of its stable states according as said junction rises or falls to a predetermined level with respect to the level of a pole of said source of voltage, transistor switching circuits for conveying current selectively from said source of voltage to said motor means so as to drive said motor means selectively in opposite senses, solely ac responsive circuit means responsive to said bistable circuit only during transfer of its state to only transiently control said transistor switching circuits to convey said current to said motor means in impulses only, and a reflective panel movable in alternate directions in response to driving of said motor in said alternate senses.

7. The combination according to claim 6, wherein is provided a resistive circuit connected only across said first photoelectric circuit and having a resistance greater than the resistance of said photoelectric cell when illuminated by said ambient light and less than the resistance of said photoelectric cell when dark.

8. A rear view mirror system for a vehicle, wherein a panel is selectively movable between two stable positions relative to said vehicle for providing via said mirror system at a viewing location a relatively bright reflected image in a first position of said panel and relatively weak reflected image in a second position of said panel, said mirror system including motor means, said motor means including an armature movable in opposite senses in response to oppositely directed currents applied to said motor means, means responsive to said armature in moving in said first sense for moving said panel to said first position and responsive to said armature in moving in said second sense for moving said reflective panel to said second position; photo-sensitive means for sensing the intensity of light directed toward said reflective panel in comparison with ambient light intensity; electrical solely ac coupling circuit means which are non-conductive to steady state voltage for directing only transient currents through said motor means in one direction in response to light intensities below a predetermined intensity sensed by said photosensitive means, and for directing only transient currents through said motor means in an opposite sense in response to variations only of intensities sensed by said photo-sensitive means which are above said predetermined intensities.

* * * * *